United States Patent
Fastert et al.

(10) Patent No.: US 11,548,247 B2
(45) Date of Patent: Jan. 10, 2023

(54) METHOD FOR PRODUCING A COMPOSITE COMPONENT

(71) Applicant: Airbus Operations GmbH, Hamburg (DE)

(72) Inventors: Claus Fastert, Hamburg (DE); Johannes Stolz, Hamburg (DE); Hauke Seegel, Berkeley (GB)

(73) Assignee: Airbus Operations GmbH

( * ) Notice: Subject to any disclaimer, the term of this patent is extended or adjusted under 35 U.S.C. 154(b) by 584 days.

(21) Appl. No.: 16/188,919

(22) Filed: Nov. 13, 2018

(65) Prior Publication Data
US 2019/0160766 A1    May 30, 2019

(30) Foreign Application Priority Data
Nov. 30, 2017  (DE) .................. 10 2017 128 501.6

(51) Int. Cl.
| | |
|---|---|
| *B29C 70/88* | (2006.01) |
| *B29C 70/48* | (2006.01) |
| *B64F 5/10* | (2017.01) |
| *B64D 45/02* | (2006.01) |
| *B29C 70/44* | (2006.01) |

(Continued)

(52) U.S. Cl.
CPC .......... *B29C 70/885* (2013.01); *B29C 70/443* (2013.01); *B29C 70/48* (2013.01); *B64D 45/02* (2013.01); *B64F 5/10* (2017.01); *B29K 2995/0005* (2013.01); *B29L 2031/3076* (2013.01); *B64C 2001/0072* (2013.01)

(58) Field of Classification Search
CPC ....... B29C 70/08; B29C 70/081; B29C 70/48; B29C 70/885
See application file for complete search history.

(56) References Cited

U.S. PATENT DOCUMENTS

| | | |
|---|---|---|
| 7,595,112 B1 | 9/2009 | Cano et al. |
| 8,462,481 B2 | 6/2013 | Lambert et al. |

(Continued)

FOREIGN PATENT DOCUMENTS

| | | |
|---|---|---|
| DE | 691 08 620 T2 | 8/1995 |
| DE | 10 2015 012 537 B3 | 3/2017 |

(Continued)

OTHER PUBLICATIONS

Johnson, R.J., and R. Pitchumani, Active Control of Reactive Resin Flow in a Vacuum Assisted Resin Transfer Molding (VARTM) Process, Journal of Composite Materials, vol. 42, No. 12 (2008), pp. 1205-1229. (Year: 2008).*

*Primary Examiner* — Matthew J Daniels
(74) *Attorney, Agent, or Firm* — Lerner, David, Littenberg, Krumholz & Mentlik, LLP

(57) ABSTRACT

A method for producing a component from a fibre-reinforced plastic includes the steps of providing a moulding tool having a tool surface, positioning a first layer of a textile semifinished product comprising dry fibres on the tool surface, arranging a second layer of an electrically conductive, resin-permeable grid on the first layer, arranging an uppermost arrangement of layers, sealing the arrangement of layers by a closure device to form a mould, introducing resin into the mould for infiltration of all the layers with the resin and curing and removal of the component.

8 Claims, 1 Drawing Sheet

(51) Int. Cl.
*B64C 1/00* (2006.01)
*B29L 31/30* (2006.01)

(56) References Cited

U.S. PATENT DOCUMENTS

| | | | |
|---|---|---|---|
| 2005/0098224 A1* | 5/2005 | Taylor | D03D 11/00 |
| | | | 139/110 |
| 2009/0051076 A1* | 2/2009 | Kofoed | B29C 70/547 |
| | | | 264/258 |
| 2013/0175740 A1 | 7/2013 | Shinoda et al. | |
| 2013/0271891 A1 | 10/2013 | Shimp et al. | |

FOREIGN PATENT DOCUMENTS

| | | |
|---|---|---|
| EP | 0465399 A2 | 1/1992 |
| EP | 2 222 563 A1 | 9/2010 |
| EP | 3228585 A1 | 10/2017 |
| GB | 2433467 A | 6/2007 |
| JP | H04232008 A | 8/1992 |
| JP | H05038774 A | 2/1993 |
| JP | 2006219078 A | 8/2006 |
| JP | 2010089501 A | 4/2010 |
| JP | 2012086547 A | 5/2012 |
| JP | 2013216012 A | 10/2013 |
| WO | 2009/080990 A1 | 7/2009 |
| WO | 2017/144449 A1 | 8/2017 |

\* cited by examiner

METHOD FOR PRODUCING A COMPOSITE COMPONENT

FIELD OF THE INVENTION

The invention relates to a method for producing a component from a fibre-reinforced plastic and to an aircraft with at least one such component.

BACKGROUND OF THE INVENTION

To operate safely, large-format components made of a fibre-reinforced plastic, in particular for aircraft, should be provided with lightning protection. Such protection takes the form for example of a conductive layer embedded in a resin. A conductive layer may in this case be bonded onto the outer side of such a large-format component. In the case of known methods, this may be carried out by bringing together a resin-containing conductive layer for the lightning protection and a preimpregnated, preformed and uncured component (prepreg) and by the subsequent curing of this composite.

For sufficient resin infusion of such layers or preforms adjacent to the conductive layer, flow aids are usually used. Known for example are mats for distributing resin over regions of a large surface area, which are additionally introduced into the preform. A surface area of the preform lying on a moulding tool is also provided with a flow aid, in order to provide this side of the preform with resin. To achieve a high surface quality of the component produced in this way, subsequent treatment of at least one side of the cured component is necessary.

EP 2 222 563 A1 discloses a lightning protection system for an aircraft structure made of a fibre-reinforced plastic in which conductive strips are arranged on an outer side of the aircraft structure.

BRIEF SUMMARY OF THE INVENTION

It would be desirable to be able to produce large-format components without complicated flow aids and at the same time to integrate sufficient lightning protection and to achieve a high quality of the surface of the component.

An aspect of the invention proposes a method for producing in particular large-format components from a fibre-reinforced plastic in which an infiltration of a component or a woven fibre fabric is possible without a separate flow aid being required, even though lightning protection is integrated in the material.

The method comprises the steps of providing a first moulding tool and a tool surface, positioning a first layer of a textile semifinished product comprising dry fibres on the tool surface, arranging a second layer of an electrically conductive, resin-permeable grid on the first layer, placing on an uppermost arrangement of layers, sealing the entire arrangement of layers on the moulding tool by means of a closure device to form a mould, introducing resin into the mould for infiltration of all of the layers with resin and curing and removal of the component.

In principle, the method is a resin transfer moulding (RTM) method or a vacuum infusion (VARI) method. The basis of this method is the provision of an arrangement of layers that is sealed by a closure device on the moulding tool. The closure device may in this case be a flexible film, which is sealed on the surface of the moulding tool by further measures. Furthermore, the closure device may take the form of a further, hard or dimensionally stable portion of the moulding tool in addition to the aforementioned moulding tool.

The aim of the method is to encapsulate the arrangement of layers in an airtight and dimensionally stable manner on the moulding tool. This may be followed by an evacuation. Resin is subsequently directed into the assembly of layers located in the mould. This may take place purely by the force of the suction produced after the optional evacuation or by pressure being applied to the resin externally.

A key aspect of the method according to an aspect of the invention is the use of the second layer of an electrically conductive, but resin-permeable grid on the first layer of a textile semifinished product. The integration of this electrically conductive layer leads to the desired lightning protection of the component. However, the configuration as a grid with throughflow openings for resin is particularly advantageous, because resin can easily flow through the grid of the second layer. The use of this electrically conductive layer that is neither embedded in resin nor impermeable per se allows the introduction of uncured resin from just one side of the component to be produced. Nevertheless, all of the layers are infiltrated with the resin. The resin-permeable configuration of this conductive layer consequently helps to make this layer act as a flow aid. Consequently, a separate flow aid is not required. The electrically conductive layer can be adapted in its structure to a previously known flow aid that does not consist of an electrically conductive material.

Resin that gets into the upper layer, such as for instance the previously mentioned uppermost arrangement of layers, or into a lower layer, such as for instance the previously mentioned first layer, can reach the fibres lying on the other side respectively of the second layer through the resin-permeable electrically conductive layer. The conductive layer is consequently likewise permeated by resin during the infiltration. Irrespective of the direction in which the resin is introduced, the first layer, which after the infiltration provides a resin-rich layer, can be built up. The electrically conductive layer is consequently embedded in resin together with the uppermost arrangement of layers, so that a previously carried out coating of the electrically conductive layer is not necessary.

For the purposes of the following description, the term "resin" is intended to refer to any matrix material that is suitable for forming with a fibre material a fibre composite component. The matrix material may in this case also already contain a catalyst (multicomponent resin system). Resin may refer in the narrower sense to thermosets, for instance epoxy resin systems. However, thermoplastics should also not be ruled out.

The expressions "upper" and "lower" used within this disclosure do not necessarily refer to a vertical extent, but should be understood in the sense of the "side facing away from the tool" (upper) and the "side facing the tool" (lower).

The entire arrangement of layers and the mould formed by the moulding tool and the closure device also does not have to be accessible from both sides for an introduction of resin. It is sufficient for it to be introduced from a single direction of this arrangement, which is for instance counter to the mould surface. It may, however, also take place from the other direction. The advantageous diffusion of resin through the entire assembly of layers consequently allows the surface quality of the conductive layer covered with resin to follow directly as a result of the surface finish of the tool surface.

In an advantageous embodiment, the method also comprises the step of evacuating the mould. As a result, resin is drawn into the individual layers for the infiltration thereof particularly or solely by the suction produced in this way. While this step could be omitted under some circumstances in the case of a previously mentioned RTM method, it would be necessary in the case of vacuum infusion.

In an advantageous embodiment, the resin-permeable electrically conductive grid is a woven fabric of a metallic material. The grid may have a specific structure to optimize the lightning protection. Such a suitable structure could be determined experimentally or on the basis of already available data. The structure of the grid also crucially determines the flow behaviour of the resin into the first layer. The simplest variant of a metallic woven fabric is a two-dimensional fabric in which metallic fibres, wires or films extend exclusively in one plane. To achieve a certain permeability, the fabric has meshes. The mesh width can be optimized to the effect of achieving both sufficient infiltration of adjacent layers and at the same time sufficient lightning protection.

In an advantageous embodiment, the resin-permeable electrically conductive grid is a three-dimensional grid of a metallic material. In the case of a three-dimensional grid structure, flow openings that tend to be still larger, for still better permeability, than in the case of a two-dimensional structure can be provided. The flow openings may in this case also extend obliquely in relation to the main plane of extent of the grid. A three-dimensional structure of the grid can be produced in a way similar to expanded metal grids, which are made by a base film or a base sheet with cuts arranged offset therein being deformed by stretching or pulling to form a three-dimensionally regularly or irregularly curved structure.

In a particularly preferred embodiment, the metallic material is copper or bronze. These materials are particularly conductive and are therefore particularly suitable for the desired lightning protection.

In a further advantageous embodiment, the first layer comprises unwoven fibres. These may be produced from the same material as that of the uppermost arrangement of layers. The first layer may for instance consist of directed fibre bundles. It may be appropriate to use fibre remains for creating the first layer. The aim of this first layer is to provide a resin-rich layer, which allows the component produced to be able to accept a coating of paint. The resin layer that is created by this first layer consequently forms the outer side of the component. The absence of an additional flow aid for the infusion of this outer layer means that a particularly good surface quality can be achieved without further measures. It is also intended that, when drilling the component produced by the method according to the invention, fibres should be prevented from escaping from the uppermost arrangement of layers.

In an advantageous embodiment, the fibres of the first layer may be configured as short fibres. These may correspond in cross section and their structure to the fibres of the uppermost arrangement of layers, but have a relatively small length, in particular in the range of a few centimetres. As a result, a very homogeneous resin-rich layer can be produced, in which the fibres as a whole can run in all directions and which as a result has a high strength.

The method may also comprise the step of placing an intermediate layer between the electrically conductive, resin-permeable grid and the uppermost arrangement of layers, the intermediate layer comprising electrically non-conductive fibres. These fibres may for instance take the form of glass fibres, aramid fibres, Kevlar fibres, polyester fibres or the like. As a result, an insulating layer is achieved between the conductive layer and the actual structural component, which is built up by the uppermost arrangement of layers. The actual structural component may be protected by this insulation from damage in the event of lightning strikes, which is of advantage in particular in the case of plastics comprising carbon fibre.

In the case of the method according to the invention, the layer may also comprise a material that is not temperature resistant, which disintegrates or decomposes during heating of the moulding tool for the curing of the component, so that uncured resin contained therein is at least partially given off into the remaining layers before its curing. As a result, the layer thickness of the resin at the first layer can be minimized. In the infiltration, a sufficient amount of resin gets into the first layer. The assembly of layers is pressed together by the closure device and the optional evacuation, so that during subsequent heating the form of the lowermost layer is changed by disintegration of the fibres. The volume of the lowermost layer is reduced and the resin contained therein can enter the adjacent layers. Nevertheless, a residue of resin remains in the lowermost layer and provides a sufficiently smooth surface of the side of the component that is facing the moulding tool.

The invention also relates to an aircraft that has at least one component which is produced by the method presented above.

The at least one component may be a tail unit, a wing or a fuselage component.

BRIEF DESCRIPTION OF THE DRAWINGS

Further features, advantages and application possibilities of the present invention emerge from the following description of the exemplary embodiments and from the figures. Here, all of the features described and/or illustrated in the figures form the subject matter of the invention individually and in any desired combination, even independently of how they are combined in the individual claims or their dependency references. Furthermore, in the figures the same reference signs are used for objects that are the same or similar.

DETAILED DESCRIPTION

Figure 1:
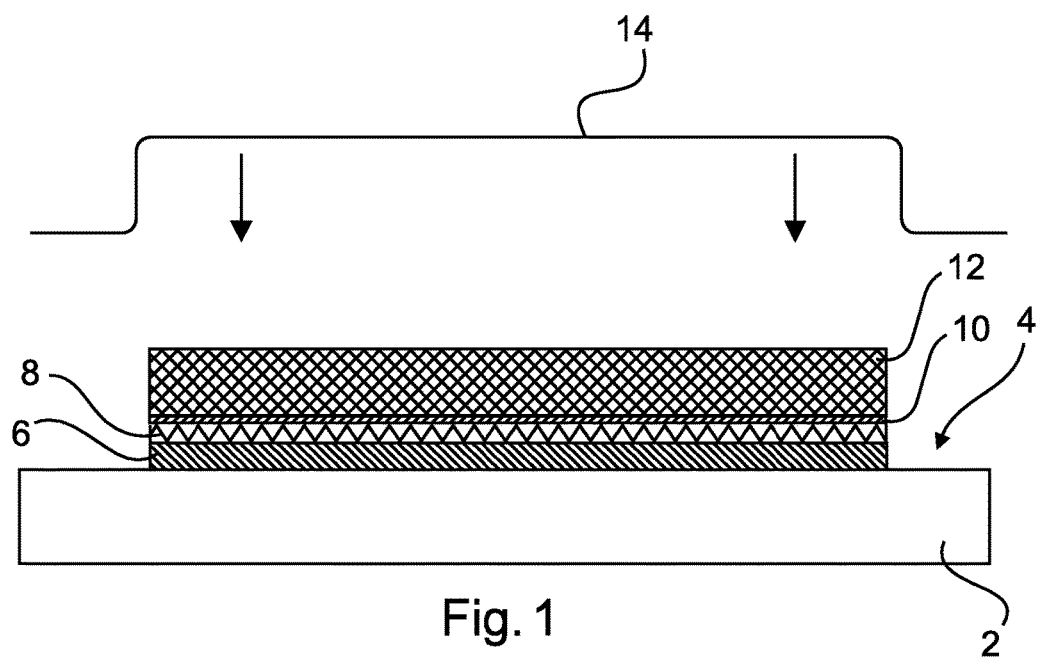
FIG. 1 shows a schematic representation of a structure of a layer built up by the method according to the invention.

FIG. 1 shows a moulding tool 2 with a tool surface 4, on which a component is produced. First, a first layer 6 of a textile semifinished product comprising dry fibres is positioned on the tool surface 4. The first layer 6 is intended for providing a homogeneous resin layer that is as smooth as possible on an outer side of the component. This outer side may for example be a surface of a component of an aircraft that in later use faces outwards. After the removal of the component from or out of the moulding tool 2, the first layer 6 may be painted, preferably without any further subsequent treatment.

On the first layer, a second layer 8 is positioned, consisting of an electrically conductive, resin-permeable grid. The second layer could for example be built up from a metallic material, which may in particular be copper or bronze. The grid may be two-dimensionally configured, in that all of the component parts of this layer, i.e. material strands, surface-area regions, portions of sheet and the like, extend in the same plane. This second layer 8 serves for lightning protection of the component produced by the method.

Alternatively and preferably, the grid 8 is however a three-dimensional grid, which has a much greater thickness than a simple sheet. The second layer 8 may be configured as an expanded metal grid. It has throughflow openings, which allow resin to pass through both in a direction towards the moulding tool 2 and in the direction away from it. If for instance the resin is distributed in the first layer 6 and the second layer 8, the flow of resin predominantly from the side facing the moulding tool 2 in the direction of the uppermost arrangement of layers 12 can be readily achieved. It goes without saying that this can also take place in the opposite direction.

As an option, an intermediate layer 10 of electrically nonconductive fibres may be positioned on this second layer 8. An electrical insulation between the second layer 8 and an uppermost arrangement of layers 12 located above it is thereby created.

The uppermost arrangement of layers 12 may comprise one or more layers of fibres that run in the same or different directions. The uppermost arrangement of layers 12 serves for the production of a structural component having a desired strength. It therefore forms the core of the actual component. In particular, the fibres used therein may be carbon fibres.

After arrangement of these various layers that are shown, which could be referred to overall as an assembly of layers, a closure device 14 is applied to the moulding tool 2. The assembly of layers is enclosed in an airtight manner. After an optional evacuation, resin may be introduced. While the introduction of resin could take place on a side of the arrangement of layers that is facing away from the moulding tool 2, it may be desired for the resin to be introduced through the side that is facing the tool surface 4. Since all of the layers allow resin diffusion as a result of their more or less open structure, the resin introduced from one side can be distributed in the entire arrangement of layers. This means in other words that the layers are infiltrated with resin jointly and from one direction.

In this case, apart from the actual function of lightning protection, the second layer 8 can also be seen as a flow aid, which allows an infiltration of the first layer 6 or of the uppermost arrangement of layers 12 with resin. In this way, the resin can be provided homogeneously over the entire lateral and vertical extent of the second layer 8.

After the introduction of a sufficient amount of resin, the component is cured, in particular by appropriately supplying heat and while keeping the closure device 14 on the tool surface 4. While doing so, in particular the optional vacuum may be maintained.

The uppermost arrangement of layers has the effect that the component that is produced by the method not only has the desired strength but also an outwardly directed corresponding lightning protection and also an insulation between a lightning protection layer and the main structural component. It is not necessary for resin to be supplied from both sides of the arrangement of layers, and no additional flow aids are required.

Figure 2:
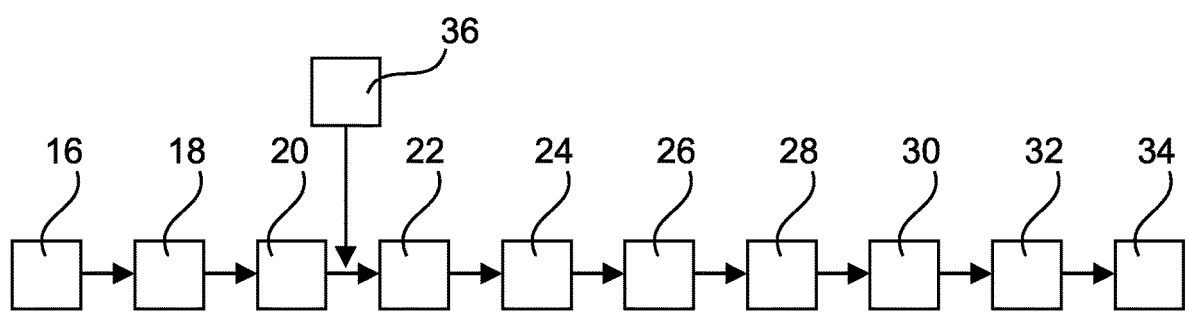
FIG. 2 schematically shows the sequence of the method for producing a component as a block diagram.

FIG. 2 shows the sequence of the method according to the invention in a block diagram. First, a moulding tool is provided 16, then a first layer of a textile semifinished product comprising dry fibres is positioned on the tool surface 18. A second layer of an electrically conductive, resin-permeable grid is arranged on the first layer 20. An uppermost arrangement of layers is subsequently positioned on the grid 22. The arrangement of layers or the assembly of layers is sealed 24 by means of the closure device to form a mould. Subsequently, if desired, the evacuation 26 may take place. After that, the introduction of resin 28 is carried out, leading as a result to the infiltration 30. After the curing 32, a removal 34 of the component may take place. Before the arrangement of the uppermost arrangement of layers, the intermediate layer, which comprises electrically nonconductive fibres, may be arranged or placed 36.

Figure 3:
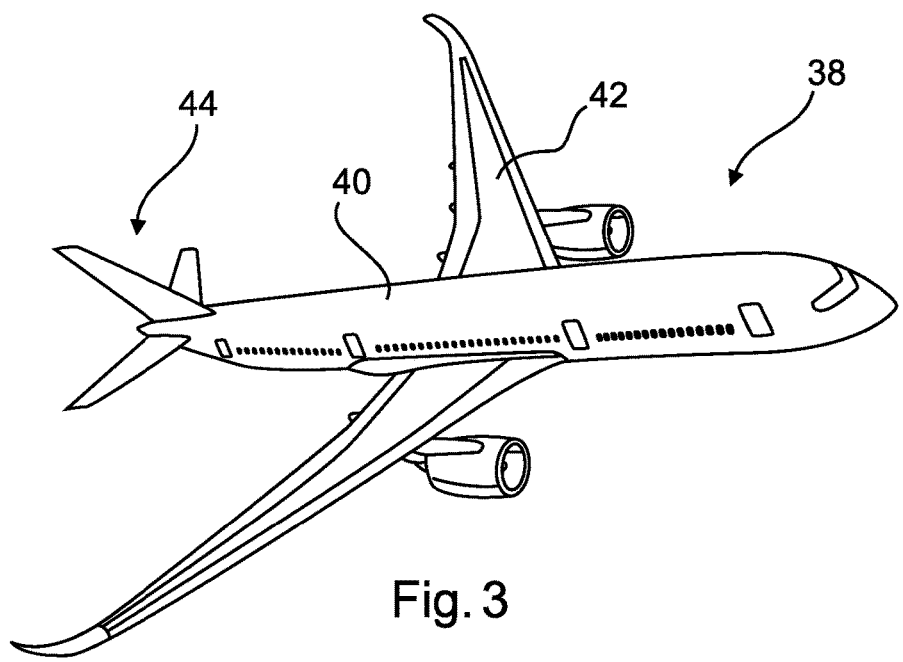
FIG. 3 shows an aircraft that has at least one component which is produced by the method according to the invention.

Finally, FIG. 3 shows an aircraft 38, which comprises a fuselage 40, wings 42 and a tail unit 44. One or more of these components or else just a portion of these components may be produced at least partially by a method presented above. As a result, the effort involved in producing such a component can be reduced and the costs can be optimized.

It is additionally pointed out that "comprising" does not rule out other elements or steps, and "a" or "an" does not rule out a multiplicity. It is also pointed out that features or steps that have been described with reference to one of the above exemplary embodiments may also be used in combination with other features of other exemplary embodiments described above. Reference designations in the claims are not to be regarded as restrictive.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for producing a component from a fibre-reinforced plastic, comprising:
providing a moulding tool having a tool surface;
positioning a first layer of a textile semifinished product comprising dry fibres on the tool surface;
arranging a second layer of an electrically conductive, resin-permeable grid on the first layer;
arranging an uppermost arrangement of layers;
sealing the arrangement of layers by a closure device to form a mould;
introducing resin into the mould for infiltration of all the layers with the resin; and
curing and removal of the component, wherein the curing comprises heating the moulding tool, and wherein the first layer includes uncured resin before or during the curing, and
wherein the first layer is configured to provide a resin layer on an outer side of the component and
wherein the first layer comprises a material configured to disintegrate or decompose during heating of the moulding tool for curing of the component, so that uncured resin contained therein is at least partially given off into the remaining layers before the curing.

2. The method according to claim 1, further comprising evacuating the mould.

3. The method according to claim 1, wherein the resin-permeable electrically conductive grid is a woven fabric of a metallic material.

4. The method according to claim 1, wherein the resin-permeable electrically conductive grid is a three-dimensional grid of a metallic material.

5. The method according to claim 1, wherein the metallic material is copper or bronze.

6. The method according to claim 1, wherein the first layer comprises unwoven fibres.

7. The method according to claim 1, further comprising placing an intermediate layer between the electrically conductive, resin-permeable grid and the uppermost arrangement of layers,
   wherein the intermediate layer comprises electrically non-conductive fibres.

8. The method according to claim 7, wherein the fibres of the intermediate layer are glass fibres.

* * * * *